(12) United States Patent
Mahapatra et al.

(10) Patent No.: US 9,373,097 B2
(45) Date of Patent: Jun. 21, 2016

(54) MOBILE ACCESS CONTROL SYSTEM WITH GEO-TAGGING

(71) Applicant: Sensormatic Electronics, LLC, Boca Raton, FL (US)

(72) Inventors: Sarthak Mahapatra, Bangalore (IN); Amit Kumar Sharma, Bangalore (IN); Mahesh Nagaraju, Bangalore (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 14/309,983

(22) Filed: Jun. 20, 2014

(65) Prior Publication Data

US 2015/0371171 A1     Dec. 24, 2015

(51) Int. Cl.
| | | |
|---|---|---|
| *G06K 17/00* | (2006.01) | |
| *G06Q 10/06* | (2012.01) | |
| *H04W 4/02* | (2009.01) | |
| *H04W 4/18* | (2009.01) | |
| *G06Q 50/30* | (2012.01) | |
| *G01C 21/26* | (2006.01) | |
| *G01S 19/13* | (2010.01) | |
| *G08G 1/127* | (2006.01) | |
| *G08G 1/00* | (2006.01) | |
| *G08B 21/02* | (2006.01) | |
| *G08B 25/01* | (2006.01) | |
| *G07B 15/02* | (2011.01) | |

(52) U.S. Cl.
CPC .......... *G06Q 10/06398* (2013.01); *G01C 21/26* (2013.01); *G01S 19/13* (2013.01); *G06Q 50/30* (2013.01); *G08G 1/127* (2013.01); *G08G 1/207* (2013.01); *H04W 4/028* (2013.01); *H04W 4/185* (2013.01); *G06K 2017/0045* (2013.01); *G07B 15/02* (2013.01); *G08B 21/028* (2013.01); *G08B 21/0261* (2013.01); *G08B 21/0269* (2013.01); *G08B 25/016* (2013.01)

(58) Field of Classification Search
USPC .................................................. 235/375, 376
See application file for complete search history.

(56) References Cited

U.S. PATENT DOCUMENTS

| | | | | |
|---|---|---|---|---|
| 7,202,801 | B2* | 4/2007 | Chou ........................... | 340/994 |
| 8,248,223 | B2* | 8/2012 | Periwal ........................ | 340/441 |
| 2010/0152961 | A1 | 6/2010 | Atri et al. | |
| 2012/0323690 | A1* | 12/2012 | Michael ...................... | 705/14.58 |
| 2014/0195310 | A1* | 7/2014 | McQuade .................... | 705/7.39 |
| 2015/0081399 | A1* | 3/2015 | Mitchell et al. ............. | 705/7.38 |

OTHER PUBLICATIONS

International Search Report and Written Opinion of the International Searching Authority, mailed on Jul. 13, 2015, from counterpart International Application No. PCT/US2015/026565, filed on Apr. 19, 2015.

* cited by examiner

*Primary Examiner* — Christle I Marshall
(74) *Attorney, Agent, or Firm* — HoustonHogle, LLP

(57) ABSTRACT

A system and method for tracking passengers during travel events and generating alerts if rules for those travel events are violated includes readers, which are installed in vehicles and obtain location data from one or more positioning systems. As passengers enter or exit the vehicles, the passengers swipe access cards in the readers. The readers then tag passenger identity information with the obtained location data. This information is then transmitted to a monitoring system, which generates rules for each of the travel event of the passengers. During the travel events, the received location data and time information is analyzed and to determine if any of the vehicles are violating the generated rules. The monitoring system generates alerts if any of the generated rules are violated.

22 Claims, 7 Drawing Sheets

MOBILE ACCESS CONTROL SYSTEM WITH GEO-TAGGING

BACKGROUND OF THE INVENTION

Transportation services include shared (or public) transportation services and individual or small group transportation services. Public transportation services typically utilize vehicles such as buses, ferries, shuttles, and rail systems (e.g., commuter trains, subways, elevated trains), to list a few examples. Individual or small group transportation services typically involve vehicles such as taxicabs, limousines, and private charters, for example.

Organizations such as businesses, schools, or local governments often provide and/or operate transportation services. In one example, businesses provide taxicab services for the pick-up and drop off of employees. In another example, school systems often operate a fleet of buses to carry students to and from school each day. In yet another example, local governments (e.g., cities and towns) commonly operate multiple public transportation services that include a combination of buses, shuttles, and rail systems.

Occasionally, passengers of the transportation services are involved in incidents or mishaps during their travel events. For example, the passengers could board the wrong buses or accidentally depart (get off) at the wrong stops. These situations may occur with young schoolchildren because they are often not paying attention during the travel events. As a result, some passengers may get lost or try to walk to their destination. Another possible incident involves the passengers of taxicabs being dropped off at the wrong destination accidentally or intentionally. Additionally, in some scenarios, taxicab drivers are part of criminal organizations and may use their taxicabs for criminal purposes (e.g., robbery, kidnapping, etc.).

Recently, some businesses have started tracking vehicles with terrestrial or satellite-based positioning systems such as the Global Positioning System (GPS). In general, active and passive tracking are two common techniques for vehicle tracking. In active vehicle tracking, a GPS tracker is installed on the vehicle and transmits realtime location data to a monitoring system. In example applications, virtual maps are provided that show current locations of buses on their routes. In passive vehicle tracking, the GPS tracker records location data at periodic intervals and stores the data in a memory of the tracking device to be accessed later. These tracking devices can be used to monitor driving behavior, such as of an employee, and whether the employee exceeded speed limits, for example.

SUMMARY OF THE INVENTION

The present invention is directed to a system for tracking passengers during their travel events and generating alerts if rules of those travel events are violated. More specifically, readers are installed in vehicles, in embodiments. When passengers enter/exit the vehicles, they swipe access cards in the readers, for example. The readers obtain passenger identify information from the access cards and location data (or geolocation data) is generated using a positioning system (e.g., GPS). The reader then tags passenger identity information with the location data and transmits the passenger identity information and the location data to a monitoring system.

The monitoring system receives the passenger identity information and the location data for the readers and generates rules for the travel event. During the travel events, the monitoring system receives additional location data from the readers. The received location data is analyzed and to determine if the vehicles are violating the rules of the travel events. The monitoring system may then generate alerts if any of the rules are violated. Some examples of rules include whether the vehicles are travelling on predicted or specified routes, whether the vehicles are exceeding predefined speed limits, whether the passengers were dropped off at the correct destinations, and whether the passengers were dropped off on time.

Additionally, the system could also be used for defining Service Level Agreements (SLAs) with companies contracted to provide the transportation services. For instance, the system could be implemented to ensure that, for example, the taxicabs are arriving at pick up locations and/or dropping off the passengers at the agreed times.

In general, according to one aspect, the invention features a tracking system for passengers during travel events in vehicles. The system includes readers installed within the vehicles that identify passengers and tag passenger identity information with location data. The system further includes a monitoring system that receives the passenger identity information and the location data from the readers. Additionally, the monitoring system generates rules for the travel events and generates alerts if the rules for the travel events are violated.

In a preferred embodiment, the monitoring system includes a rules engine that analyzes the location data from each of the readers to determine if the rules for the travel events were violated.

In a typical implementation, the monitoring system compares location data obtained by the readers to predicted routes to determine if the vehicles have deviated from the predicted routes for the travel events. Additionally, the monitoring system compares current times to arrival time windows for the passengers to determine if the vehicles have exceeded the arrival time windows the travel events. Further, the monitoring system compares vehicle speeds to rules governing maximum vehicle speeds to determine if the vehicles have violated the rules for maximum vehicle speeds for the travel events.

In embodiments, the monitoring system includes an event database that stores the location data obtained by the readers. This location data are associated with the travel events.

Generally, the monitoring system generates the rules for each travel event based on preferences of the passengers, destinations of the passengers, and predicted routes for the passengers. In addition, the monitoring system includes a rules database to store the rules generated for the travel events, the rules database being accessed by a rules engine to determine if the rules for travel events were violated.

In one example, the location data are obtained from satellite-based positioning systems.

In a typical implementation, the generated alerts are forwarded to law enforcement or first responders.

In general, according to another aspect, the invention features a method for tracking passengers in vehicles during travel events. The method includes identifying passengers via readers installed in the vehicles and tagging passenger identity information with location data, which is obtained by the readers. The method further includes sending the passenger identity information and the location data from the readers to a monitoring system. Additionally, the method includes the monitoring system generating rules for the travel events and generating alerts if the rules for the travel events are violated.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
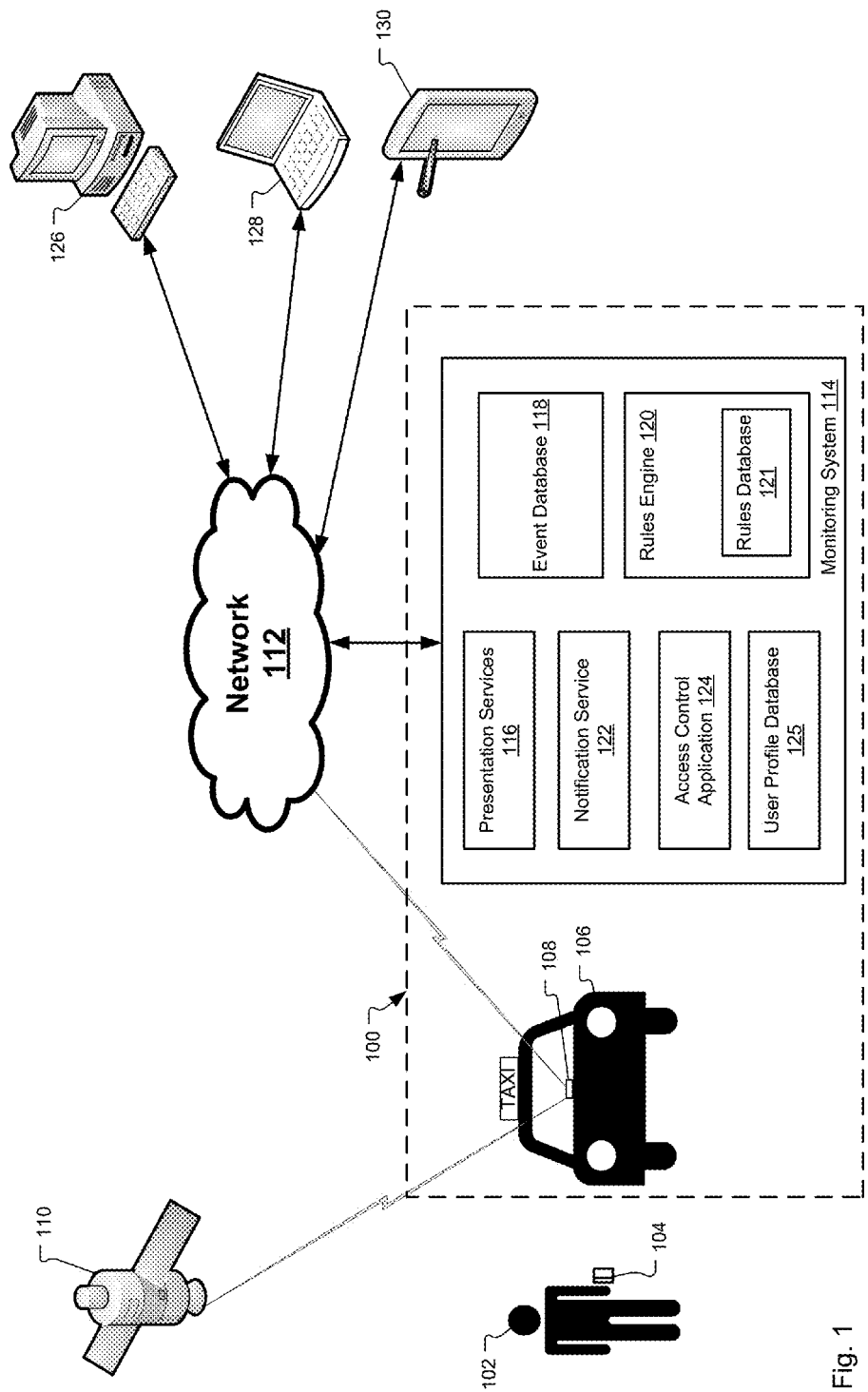
FIG. 1 is a block diagram illustrating a tracking system for passengers, which includes a reader installed within a vehicle and a monitoring system.

FIG. 1 is a block diagram illustrating a tracking system 100 for tracking passengers, which includes a georeader (reader) 108 installed within a vehicle 108 and a monitoring system 114.

In a typical implementation, a passenger 102 swipes an access card (e.g., a keycard) 104 in a reader 108. In an alternative embodiment, the access card could be a contactless smart card, which is able to communicate to the reader 108 over short distances (e.g., up to 10 centimeters) via radio waves. In this scenario, the passenger simply holds the access cards within range of the reader 108 in order to communicate with the reader 108. In different embodiments, the reader could be a handheld or mobile device carried by the driver of the vehicle.

In the illustrated example, the vehicle 106 is a taxicab. Alternatively, the vehicle 106 could be a limousine, pedicab, or private charter vehicle, to list a few examples.

After the passengers 102 swipes the access card 104, the reader 108 reads the passenger identity information from the access card 104. Additionally, the reader 108 also obtains or generates geolocation data (location data) from a positioning system. In a typical implementation, the location data are obtained from a satellite-based positioning system. Some examples of satellite-based positioning systems include the NAVSTAR Global Positioning System (or simply GPS), GLONASS (Global Navigation Satellite System), Galileo, IRNSS (Indian Regional Navigation Satellite System), and BeiDou Navigation Satellite System.

Alternatively, hybrid positioning systems could also be used to obtain location data. In general, hybrid positioning systems obtain location based on a combination of satellite-based positioning systems, and possibly terrestrial systems such as systems using cellular tower based systems and/or Wi-Fi based positioning systems.

Returning to FIG. 1, after the reader obtains the location data, the reader 108 tags the passenger identity information with the location data and sends the tagged passenger identity information and the location data to the monitoring system 114 via the network 112. The network 112 is generally a private and/or public data network (e.g., an enterprise network, Wi-Max or Wi-Fi network, and/or the Internet).

The monitoring system receives the passenger identity information and the location data from the readers, generates a new travel event, and generates rules for the travel event of the passengers.

In a typical implementation, a rules engine 120 of the monitoring system 114 analyzes the location data and passenger identity information from the reader 108 to determine if any rules were violated. The rules database 121 stores rules that are generated for each travel event. An event database 118 stores event data (e.g., location data, access card swipe times, origins, and destinations) that are generated during the travel events of the passengers. Similarly, a passenger profile database 125, which stores passenger information such as names, phone numbers, email addresses, and employee ID numbers, for example.

Additionally, the monitoring system 114 further includes a presentation service 116, a notification service 122, and an access control application 124. Typically, the presentation service 116 provides a user interface to devices 126, 128, 130. These devices could be workstation computers, laptop computers, or tablet computers, to list a few examples. The access control application 124 is typically proprietary or third software that provides access to passenger identity information stored on the access cards. A notification service 122 sends notifications to authorized recipients in the event that a rule is violated. These recipients are typically law enforcement, first responders, and/or relatives of the passengers, to list a few examples. Generally, the notifications may be sent via phone message, text or SMS (short message service), and/or electronic mail, for instance.

Figure 2:
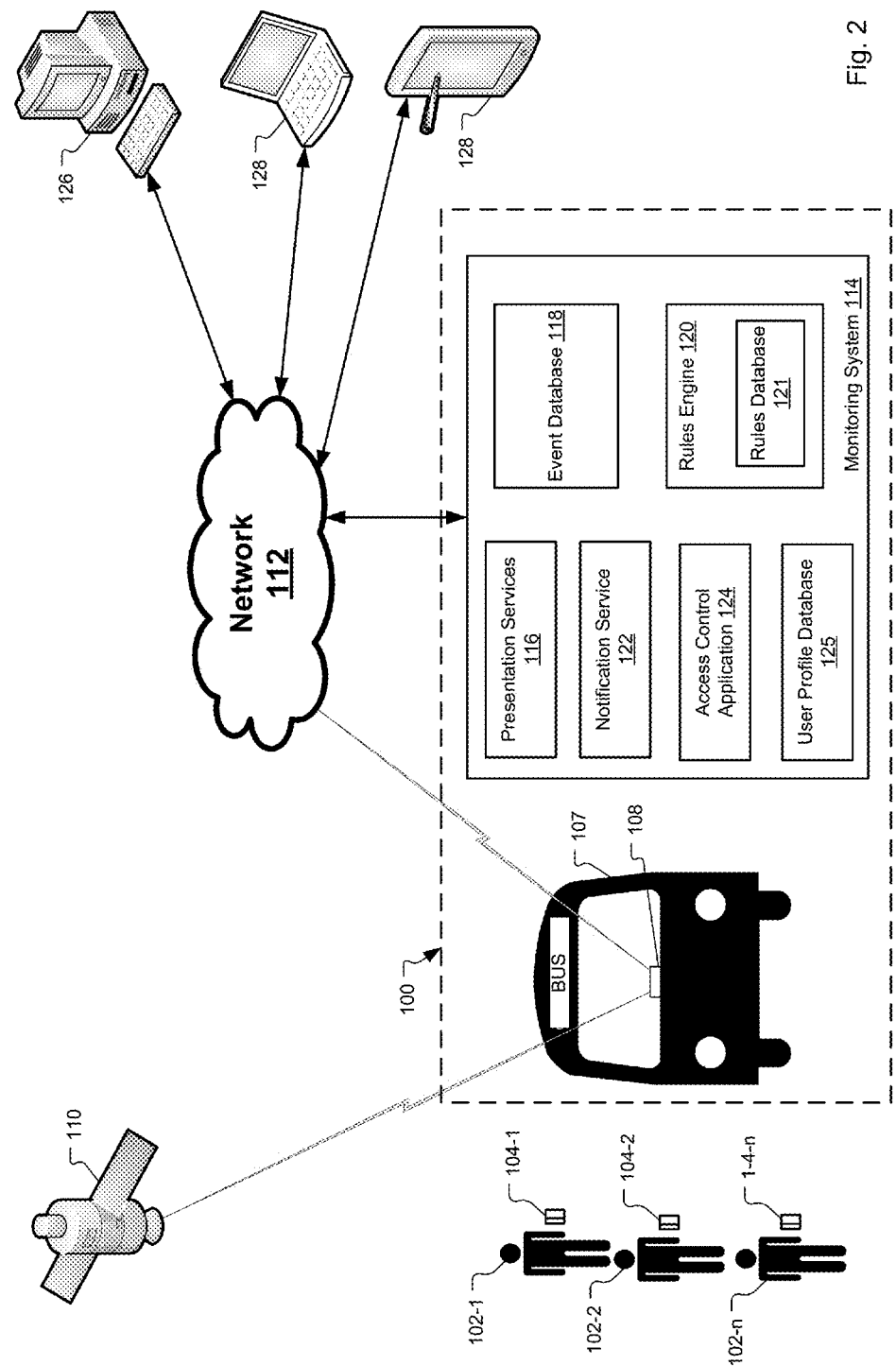
FIG. 2 is a block diagram illustrating an alternative embodiment of the tracking system for passengers.

FIG. 2 is a block diagram illustrating an alternative embodiment of the tracking system 100.

In general, the tracking system operates nearly identical to the embodiment described with respect to FIG. 1. In this embodiment, however, the vehicle 107 is a bus. Accordingly, this embodiment includes passengers 102-1 to 102-n that will typically board and depart the vehicle at different stops. Likewise, origin locations and destinations are stops along the bus route. In alternative embodiments, the vehicle 107 could be other vehicles that provide public or shared transportation services such as water taxis, ferries, shuttles, and rail systems (e.g., trains, commuter rails, subways, elevated), to list a few examples.

Figure 3:
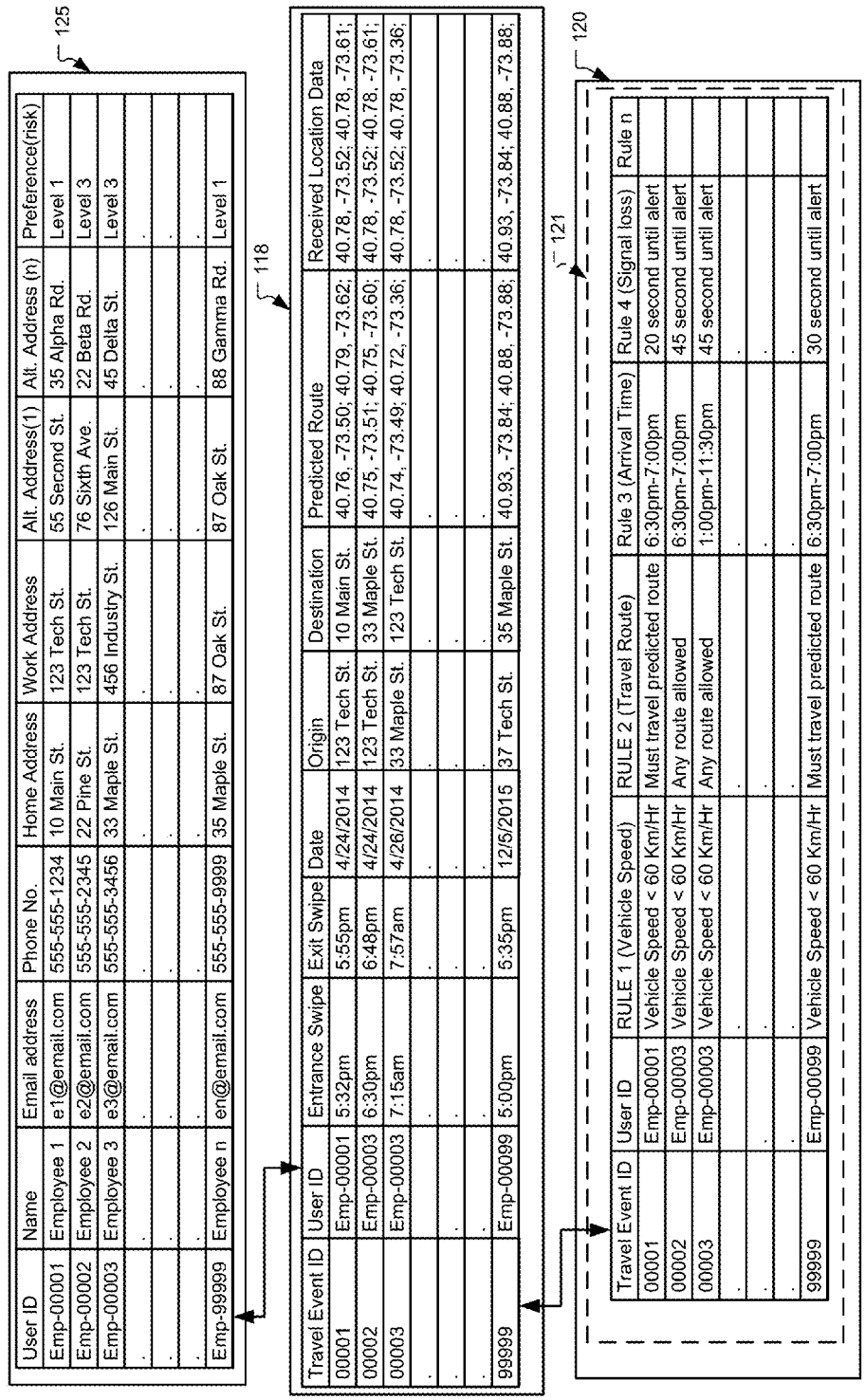
FIG. 3 illustrates an example of records stored in the passenger profile database, event database, and rules database of the monitoring system.

FIG. 3 illustrates an example of records stored in the passenger profile database 125, event database 118, and rules database 121 of the monitoring system 114.

While the illustrated example depicts the databases as separate databases, in a typical implementation, the databases are different tables in a relational database. Similarly, the illustrated fields and records are examples provided for illustrative purposes. Alternative embodiment could have greater or fewer fields.

In the illustrated example, the passenger profile database 125 includes fields for information of the passengers such as passenger ID, name, electronic mail (email) address, phone number, home address, work address, an alternate address, a secondary alternate address, and a risk preference.

The event database 118 includes fields for event data such as travel event ID number, passenger ID, and entrance swipe time, an exit swipe time, date, origin location, a destination, a predicted route, and received location data. In the illustrated example, the location data are stored as latitude and longitude coordinates.

The rules database 121 includes fields for the rules that are created for each of the travel events. In the illustrated example, the rules database includes fields for the travel event ID, the passenger ID number, vehicle speed limit, a travel route, an arrival time, and loss of signal. Additionally, other rules could also be applied to each of the travel events.

Figure 4:
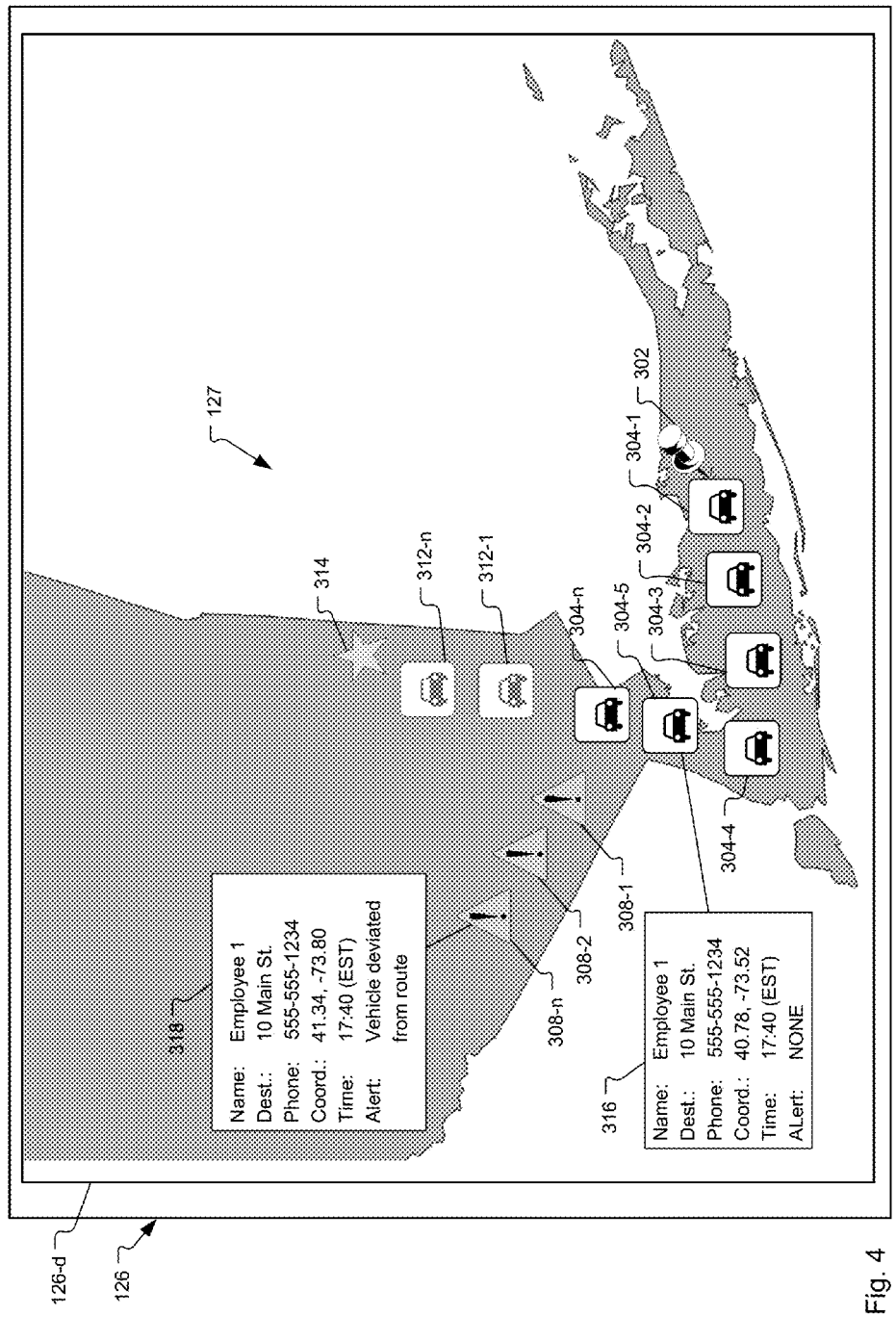
FIG. 4 illustrates an example of a user interface displayed on a display of a user device to enable users to monitor passengers during travel events.

FIG. 4 illustrates an example of a user interface 127 displayed on a display 126-d of a user device 126 to enable users to track passengers during travel events.

In a typical implementation, the user interface 127 is a proprietary interface provided by the presentation service 116 of the monitoring system 114. Alternatively, the user interface 127 could be third party tracking/mapping software. Generally, the user interface is accessed via a website or by invoking an application on the user device.

In the illustrated example, an origin location for a travel event is shown as a pushpin 302. Similarly, a star icon 314 is displayed at the destination. Selecting either icon display the address for the icon.

A predicted route for the travel event is illustrated as a series "grayed-out" predicted route icons (e.g., 312-1 to 312-n). These predicted route icons provide a visual indication of the predicted route for the vehicle. As the vehicle moves towards the destination 314, travel icons 304-1 to 304-n are displayed in place of the grayed-out icons.

Selecting one of the travel icons displays additional travel event information in a window. The window 316 displays an employee name, the destination, a phone number, location data, the time the data was recorded, and an alert status. Other information could be displayed in the window 316 such as the origin location, a list of rules for the travel event, travel event ID, vehicle speed (either real time or when the information was obtained), or passenger preferences, to list a few examples. In yet another embodiment, the location data could be applied to mapping software to provide street names in addition to the location data.

If the vehicle violates a rule (e.g., deviation from the predicted route), one or more alerts are generated by the monitoring system 114. When an alert is generated, an alert icon 308-1 to 308-n is displayed in the user interface 127. Selecting one of the alert icons 308-1 to 308-n displays alert information in a window 318. In the illustrated example, the window 318 displays the employee name, destination, phone number, location data, time the data was recorded, and whichever rule (or rules) were violated.

Figure 5:
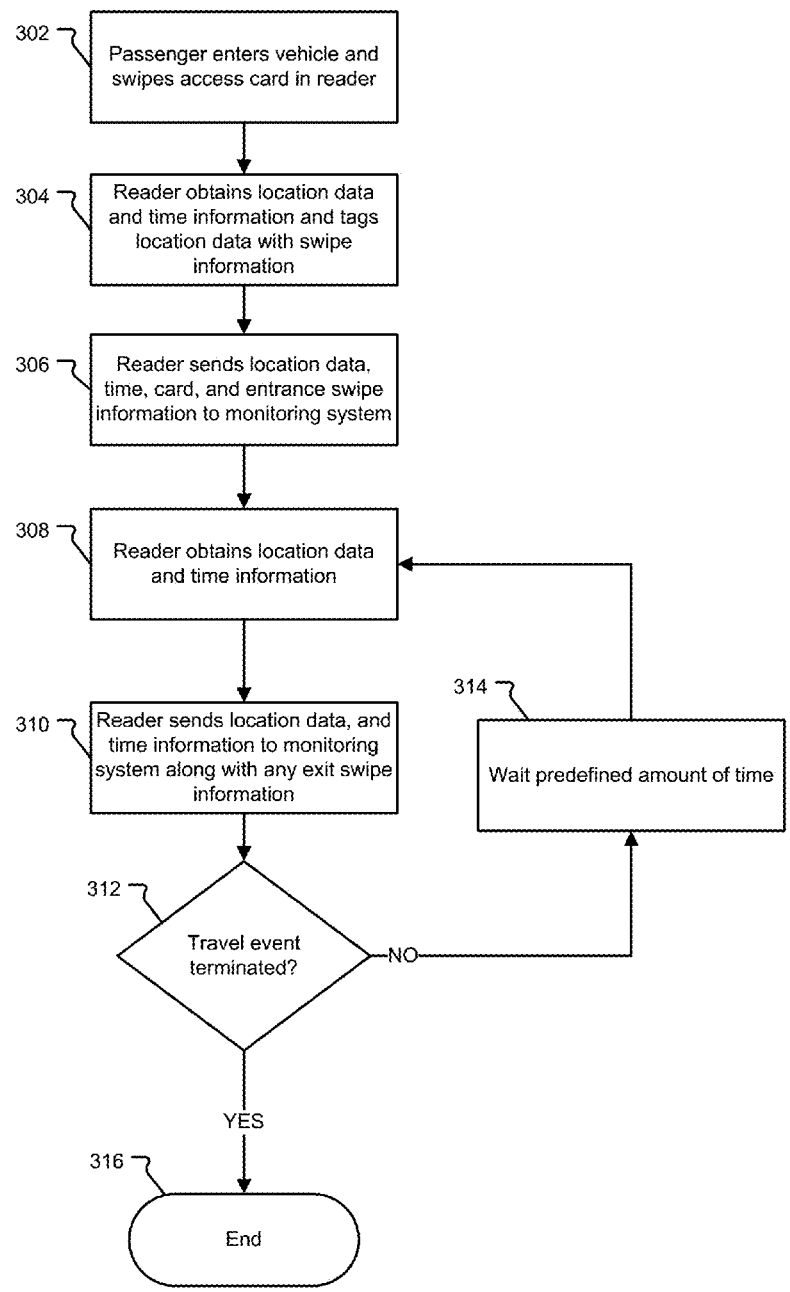
FIG. 5 is a flow chart illustrating the steps performed by the reader in response to entrance and/or exits swipes by the passengers.

FIG. 5 is a flow chart illustrating the steps performed by the reader in response to entrance and/or exit swipes of the access cards by the passengers.

In the first step 302, the passenger 102 enters the vehicle 106 and swipes their access card 104 in the reader 108. The reader 108 obtains or generates location data (geolocation data) and time information and tags the location data with swipe information. Next, the reader sends the location data, the time information, access card information, and entrance swipe information to the monitoring system 114 in step 306.

The reader 108 obtains location data and time information in step 308. Typically, the location information generated from satellite-based range data. The reader sends location data and time information to monitoring system along with any exit swipe information in step 310. The reader 108 then determines if the travel event is terminated in step 312. If the travel event is terminated, then the reader 108 stops obtaining location data.

If, however, the travel event was not terminated, then the reader 108 waits a predetermined amount of time in step 314. The predetermined amount of time is typically a user defined interval that enables the user to select the length of time between each acquisition of location data by the reader 108.

Figure 6:
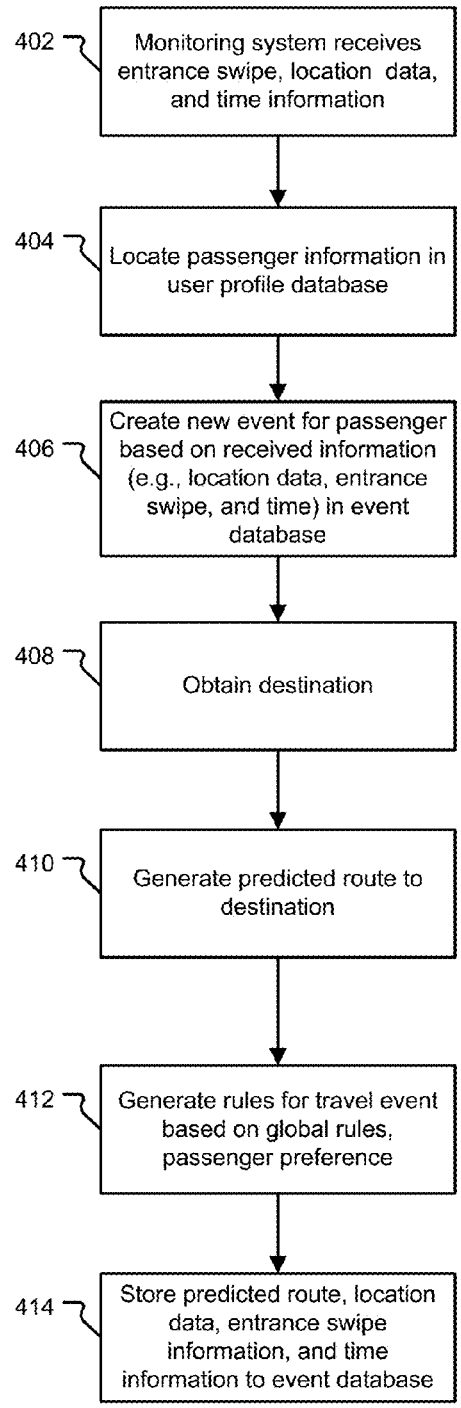
FIG. 6 is a flow chart illustrating how the monitoring system receives information from the reader and then generates new travel events and rules for the travel events.

FIG. 6 is a flow chart illustrating how the monitoring system 114 receives information from the reader 108 and then generates new travel events and rules for the new travel events.

In the first step 402, the monitoring system 114 receives the entrance swipe information, location data, and time information from the reader 108. The monitoring system then locates passenger information in the passenger profile database 125 in step 404. Next, in step 406, the monitoring system 114 creates a new travel event for the passenger based on received information (e.g., location data, entrance swipe, and time) in the event database 118.

The monitoring system 114 obtains a destination in step 408. In some examples, this destination is predicted based on the previous destinations of the passenger for the same weekday and travel time. In other examples, the passenger enters the destination prior to or at the time of entering the vehicle. In other examples, the destination is taken from the passenger profile information stored passenger profile database 125

Next, the monitoring system 114 generates a predicted route or assesses a specified to the destination in step 410. In the next step 412, the monitoring system 114 generates rules for the travel event based on global rules and/or passenger preference. In the next step 414, the monitoring system 114 stores the predicted route, the location data, the entrance swipe information, and the time information to the event database 118.

Figure 7:
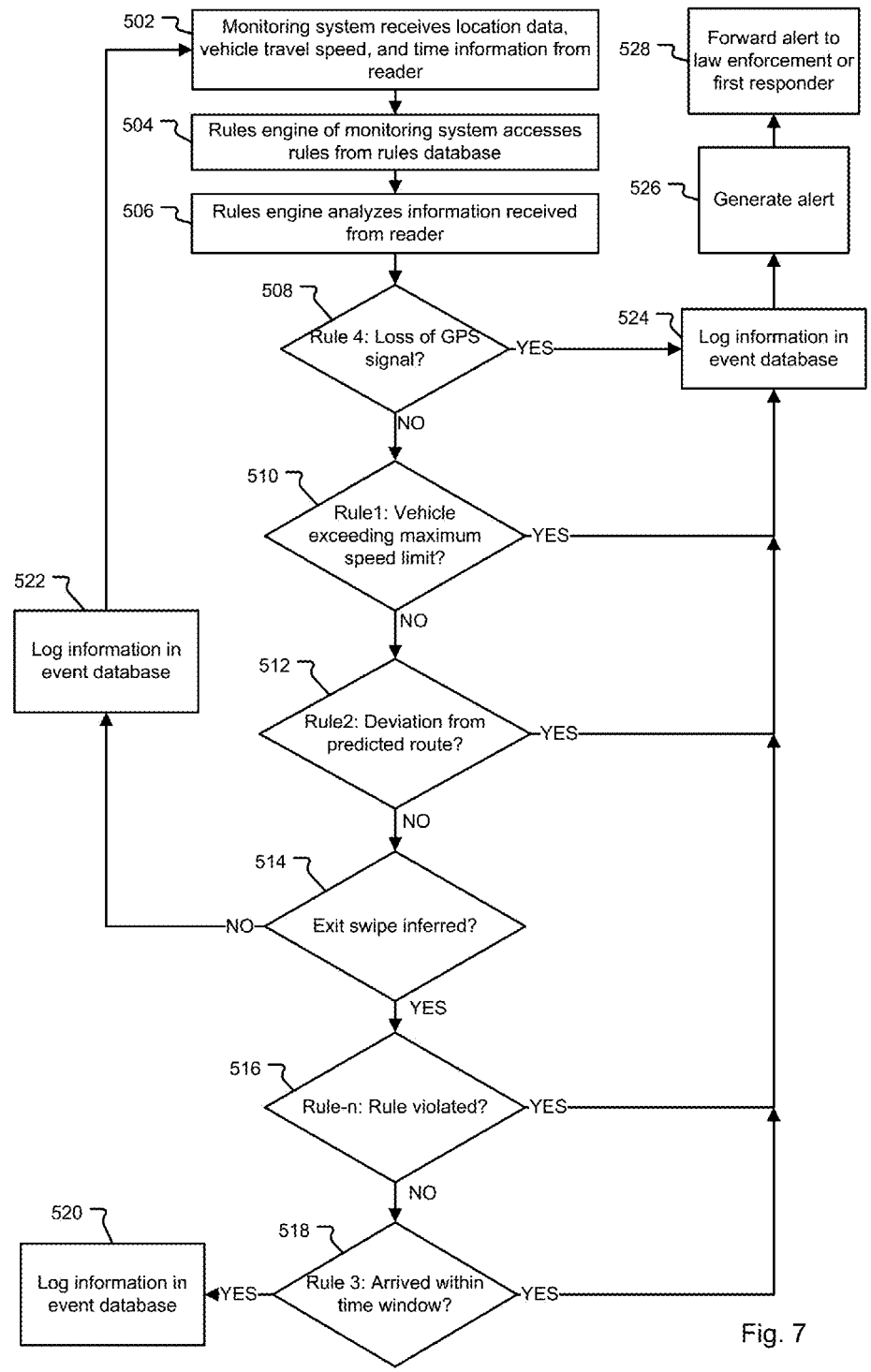
FIG. 7 is a flow chart illustrating the steps performed by the monitoring system to track the passengers and ensure that the rules for the travel events are not violated.

FIG. 7 is a flow chart illustrating the steps performed by the rules engine 120 of monitoring system 114 to track the passengers and ensure that generated rules are not violated.

In the first step 502, the monitoring system 114 receives location data, vehicle travel speed information, and time information from the reader 108. Next, the rules engine 120 accesses the rules from the rules database 121 in step 504. The rules engine 120 then analyzes the location data, the vehicle travel speed information, and the time information in step 506.

In the next steps (i.e., steps 508-518), the rules engine 120 determined if any of the rules are violated. If any of the rules are violated, then an alert is generated.

In more detail, in step 508, the monitoring system 114 determines if the reader 108 has experienced a loss of GPS signal. In general, the loss of the signal must exceed a predetermined time limit. This is because GPS receivers typically receive location data from at least four satellites and the receivers often lose GPS signal from one or more of the satellites for short periods of time when traveling through cities that have tall buildings, tunnels or covered roadways, and/or other areas that lack a clear view of the sky (e.g., tree lined roads).

If the reader 108 has not lost the GPS signal, then the rules engine 120 checks whether the vehicle is exceeding a maximum speed limit in step 510. If the vehicle is not exceeding the maximum speed limit, then the rules engine 120 determines if the vehicle has deviated from the predicted route in step 512. In a typical implementation, this is performed by comparing predicted location data stored in the event database 118 to location data obtained by the reader 114 during the travel event.

If the vehicle has not deviated from the predicted route, then the rules engine 120 determines if exit swipe information is inferred in step 514. If the exit swipe is not inferred, then the information is logged in the event database 118 of the monitoring in step 522.

Step 516 and Rule-n represent other and/or additional rules that could be checked by the rules engine 120. For example, in one embodiment, the reader 108 could include a keypad and the passengers would be required to enter a password or personal identification number (PIN) after swiping their keycards. This would authenticate the passengers' identity. Similarly, an alert could be generated if a wrong password or PIN is entered.

Alternatively, in examples in which the vehicle is a school bus, the rules engine 120 could verify that all expected passengers have boarded the bus. Additionally, the rules engine 120 could also verify that there are no unexpected passengers on the bus. These rules would ensure that all passengers are aboard the correct buses. In these examples, alerts can be sent to one or more bus drivers in the fleet to allow the situation to be resolved (e.g., transfer students to other buses) before the buses leave the school. Similarly, alerts could be sent to parents identifying departure and expected arrival times.

In yet another example, the rules engine 120 could include a rule for checking which passengers got off at which stops to ensure that the passengers do not get off at the wrong stops. Alerts could be sent the bus driver to prevent the bus from heading to the next stop until the situation is resolved.

Returning to step 516, if Rule-n is not violated, then the rules engine 120 determines if the vehicle 106 with the passenger 102 has arrived within the predicted time window in step 518. If the vehicle has arrived within the predicted time window, then the rules engine 120 sends the information to the event database 118.

If any of the rules are violated, then the monitoring system 114 logs information in the event database 118 in step 524, generates an alert and step 526, and forwards the alert to law enforcement or first responders in step 528. Alternatively, the alert could also be forwarded to other authorized personnel such as emergency contacts of the employees, supervisors of the employee, and/or family members of the passengers, to list a few examples.

While this invention has been particularly shown and described with references to preferred embodiments thereof, it will be understood by those skilled in the art that various changes in form and details may be made therein without departing from the scope of the invention encompassed by the appended claims.

What is claimed is:

1. A tracking system for passengers during travel events in vehicles, comprising:
   readers installed within the vehicles that identify passengers and tag passenger identity information with location data; and
   a monitoring system that receives the passenger identity information and the location data from the readers, the monitoring system generating rules for the travel events and generating alerts if the rules for the travel events are violated; and
   wherein the monitoring system generates the rules for each travel event based on passenger preferences.

2. The system according to claim 1, wherein the monitoring system includes a rules engine that analyzes the location data from each of the readers to determine if the rules for the travel events were violated.

3. The system according to claim 1, wherein the monitoring system compares location data obtained by the readers to predicted routes to determine if the vehicles have deviated from the predicted routes for the travel events.

4. The system according to claim 1, wherein the monitoring system compares current times to arrival time windows for the passengers to determine if the vehicles have exceeded the arrival time windows for the travel events.

5. The system according to claim 1, wherein the monitoring system compares vehicle speeds to rules governing maximum vehicle speeds to determine if the vehicles have violated the rules for maximum vehicle speeds for the travel events.

6. The system according to claim 1, wherein the monitoring system includes an event database that stores the location data obtained by the readers, the location data being associated with the travel events.

7. The system according to claim 1, wherein the monitoring system generates the rules for each travel event based on preferences of the passengers, destinations of the passengers, and predicted routes for the passengers.

8. The system according to claim 1, wherein the monitoring system includes a rules database to store the rules generated for the travel events, the rules database being accessed by a rules engine to determine if the rules for travel events were violated.

9. The system according to claim 1, wherein the location data are obtained from satellite-based positioning systems.

10. The system according to claim 1, wherein the generated alerts are forwarded to law enforcement or first responders.

11. The system according to claim 1, wherein the readers are accessible to passengers of the vehicles such that the readers obtain the passenger identity information from access cards of the passengers entering or exiting the vehicles.

12. The system according to claim 1, wherein the readers generate the location data for passengers from a positioning system.

13. A method for tracking passengers in vehicles during travel events, the method comprising:
   identifying passengers via readers installed in the vehicles;
   tagging passenger identity information with location data, which is obtained by the readers;

sending the passenger identity information and the location data from the readers to a monitoring system;

the monitoring system generating rules for the travel events;

the monitoring system generating alerts if the rules for the travel events are violated; and the readers determining if the travel events have terminated, wherein the readers stop obtaining the location data if the travel events have terminated.

14. The method according to claim 13, further comprising the monitoring system analyzing the location data from each of the readers to determine if the rules for the travel events are violated.

15. The method according to claim 13, wherein generating the alerts includes the monitoring system comparing the location data for the vehicles to predicted routes to determine if the vehicles deviated from the predicted routes for the travel events.

16. The method according to claim 13, wherein generating the alerts includes the monitoring system comparing current times to arrival time windows for the passengers to determine if the vehicles have exceeded the arrival time windows for the travel events.

17. The method according to claim 13, wherein generating the alerts includes the monitoring system comparing vehicle speeds to rules governing maximum vehicle speeds to determine if the vehicles have violated the rules for the maximum vehicle speeds for the travel events.

18. The method according to claim 13, wherein the monitoring system stores the location data obtained by the readers in an event database, the location data being associated with the travel events.

19. The method according to claim 13, wherein the location data is obtained from satellite-based positioning systems.

20. The method according to claim 13, further comprising forwarding the generated alerts to law enforcement or first responders.

21. A tracking system for passengers during travel events in vehicles, comprising:

readers installed within the vehicles that identify passengers and tag passenger identity information with location data; and a monitoring system that receives the passenger identity information and the location data from the readers, the monitoring system generating rules for the travel events and generating alerts if the rules for the travel events are violated; and wherein the monitoring system comprises:

a passenger profile database for storing passenger information, wherein the monitoring system locates the passenger information in the passenger profile database after receiving the passenger identity information and the location data;

an event database for creating event data for travel events of the passengers based on the received passenger identity information and the location data; and a rules engine for analyzing the location data and the passenger identity information from the readers to determine if the rules for the travel events were violated, wherein the rules engine includes a rules database for storing the generated rules for the travel events.

22. The system according to claim 21, wherein the stored passenger information comprises a risk preference.

\* \* \* \* \*